United States Patent
Wein et al.

(10) Patent No.: US 8,670,033 B2
(45) Date of Patent: Mar. 11, 2014

(54) MOMENTUM BALANCE OPTICAL SCANNING FOR WIDE FIELD OF VIEW OPTICAL SENSORS

(75) Inventors: Steven J. Wein, Sudbury, MA (US);
Gerard M. Perron, Acton, MA (US);
James D. Targove, Lunenburg, MA (US)

(73) Assignee: BAE Systems Information and Electronic Systems Integration, Nashua, NH (US)

( * ) Notice: Subject to any disclaimer, the term of this patent is extended or adjusted under 35 U.S.C. 154(b) by 375 days.

(21) Appl. No.: 13/093,367

(22) Filed: Apr. 25, 2011

(65) Prior Publication Data
US 2011/0261153 A1  Oct. 27, 2011

Related U.S. Application Data

(60) Provisional application No. 61/328,290, filed on Apr. 27, 2010.

(51) Int. Cl.
*H04N 7/18* (2006.01)
*H04N 9/09* (2006.01)
*H04N 5/225* (2006.01)

(52) U.S. Cl.
USPC .................. 348/144; 348/262; 348/218.1

(58) Field of Classification Search
None
See application file for complete search history.

(56) References Cited

U.S. PATENT DOCUMENTS

| | | | |
|---|---|---|---|
| 3,845,929 A * | 11/1974 | Reekie et al. | 248/562 |
| 4,723,142 A * | 2/1988 | Momiyama et al. | 396/111 |
| 6,359,681 B1 * | 3/2002 | Housand et al. | 356/4.01 |
| 6,862,147 B1 * | 3/2005 | Sonstroem | 359/738 |
| 2005/0205778 A1 * | 9/2005 | Kitai et al. | 250/309 |
| 2006/0033992 A1 * | 2/2006 | Solomon | 359/462 |
| 2009/0295986 A1 * | 12/2009 | Topliss et al. | 348/374 |
| 2010/0085650 A1 * | 4/2010 | Wu et al. | 359/717 |
| 2011/0205641 A1 * | 8/2011 | Shih | 359/717 |

OTHER PUBLICATIONS

Cha Zhang, Tsuhan Chen, "Multi-View Imaging: Capturing and Rendering Interactive Environments," cviie, pp. 51-67, Computer Vision for Interactive and Intelligent Environment (CVIIE'05), 2005.*
Brian Leininger, et al. "Autonomous real-time ground ubiquitous surveillance-imaging system (ARGUS-IS)", Proc. SPIE 6981, Defense Transformation and Net-Centric Systems 2008, 69810H (Apr. 3, 2008); doi:10.1117/12.784724; http://dx.doi.org/10.1117/12.784724.*

* cited by examiner

*Primary Examiner* — Joseph Ustaris
*Assistant Examiner* — Jill Sechser
(74) *Attorney, Agent, or Firm* — Daniel J. Long

(57) ABSTRACT

A compact momentum-balanced internal optical scanning mechanism is provided for a wide angle camera used in photo reconnaissance and the like, in which a large high resolution but not fully populated array is used to provide full scene coverage with high pixel densities, in which sharpness is maintained and in which the image can be scanned without vibration due to momentum compensation so that the image may be shifted on the focal plane array in such a manner that images focused on a dark portion of the array will move to an active portion of the array, with the sequential read out of the information concatenated into high resolution full scene image data.

18 Claims, 7 Drawing Sheets

MOMENTUM BALANCE OPTICAL SCANNING FOR WIDE FIELD OF VIEW OPTICAL SENSORS

RELATED APPLICATIONS

This Application claims rights under 35 USC §119(e) from U.S. Application Ser. No. 61/328,290 filed Apr. 27, 2010, the contents of which are incorporated herein by reference.

FIELD OF THE INVENTION

This invention relates to optical systems and more particularly to a momentum balance scanning system for use with wide field of view optical sensors.

BACKGROUND OF THE INVENTION

In aerial reconnaissance, in order to cover a large amount of area in a single exposure a wide angle camera is required. Not only must wide angle optics be used, in order to resolve small objects, an extremely large focal plane array is required to capture the full scene shot by the wide angle camera. Thus, wide field of view optical systems or cameras require extremely large focal plane detector arrays.

It is noted that extremely large focal plane detector arrays cannot be fabricated monolithically to capture the entire field of view in one exposure. The result is that one must use a mosaic of limited size focal plane detector arrays.

For instance, a wide angle high resolution camera might have a lens which is 50.8 centimeters (20 inches) in diameter and would require a focal plane array of between 50.8 and 101.6 centimeters (20 and 40 inches) on a side. Moreover, the high resolution involved in capturing motion oftentimes requires at least a half billion pixels. This high resolution pixel density can only be provided through the use of a mosaic of smaller high pixel density focal plane array detectors.

The mosaic however has gaps or dark stripes between the small detector arrays. It is in these gaps that image data is lost because there are no active detectors in the gap. When a point on the image is focused onto a gap or stripe between adjacent detector arrays the image data is lost.

High resolution is required in reconnaissance where one wants to capture all terrain features as well as to be able to detect motion of individuals or vehicles. This scenario requires at least a half billion pixel resolution as well as a wide field of view camera to be able to surveil large areas. For instance, it is desirable to take a single picture with a wide angle camera having a field of view between 40° and 60° and simultaneously capture the full scene on the pixels of a large focal plane array.

Thus, it is important to be able to fabricate a focal plane array with multiple smaller detector arrays, in one case having 5 million detector pixels per array. If one combines 90 of these smaller detector arrays into a mosaic, then the combined array will have as many as 450 million pixels.

This type of resolution is adequate to detect motion of human beings on the ground, but suffers a number of problems, not the least of which are the gaps between the individual detector arrays. The gaps between any two of the adjacent focal plane arrays effectively results in a region or stripe where there are no photo detectors. The result is a checkerboard cut-out of the imaged terrain due to the gaps between the smaller detector arrays. With such a mosaic one can lose one quarter of the image.

Losing one quarter of the information in an image is clearly unacceptable. In the past there have been solutions involving scanning the image across the photo detector array mosaic so that image information is available for the entire full scene, although not simultaneously. Rather, during a scan of the image on the focal plane array, in the past one sequentially samples the array at intervals and uses available image data to fill in the lost data in a concatenation process. The scanning involves moving the image periodically back and forth across the mosaic in a reciprocating scanning fashion.

For full motion capture it is important to have a frame rate of between 5 and 30 frames per second. This means that, without a fully monolithic focal plane array, the scanning must toggle the image on the focal plane array back and forth at least 10 to 60 times per second. The image is scanned or toggled back and forth across the focal plane detector mosaic, such that the image moves for instance by 1° or 2°. This assures that information in the image is not lost because while at one instant of time the focused image may fall on a dark or non-light detecting portion of the array, at another time this same image will have been scanned onto an adjacent active detector chip.

Thus, in order to make a planar photo detector mosaic one must use a number of smaller detector chips which leave dark spaces between the chips where light is not detected. By scanning the image back and forth or up and down across the array mosaic, while simultaneous image detection is not possible, sequential image detection captures all of the available pixels.

In the past, in order to avoid the problem of having focused energy impinge on the dark regions between the small detector arrays, one can utilize two separate cameras having optical axes offset or skewed one with respect to the other. Thus, with two detector arrays having stripes of detectors and two cameras one can simultaneously detect full scene pixel information.

It is thus possible to utilize identical cameras with identical focal plane arrays, with the cameras tilted slightly differently in two dimensions. If for instance the checkerboard arrays were located behind these cameras, then for one direction one would need two separate cameras skewed one with respect to the other to cause an offset in their centerlines of for instance 1°. For orthogonally running gaps or stripes one would need another pair of offset cameras. Thus, four separately tilted cameras would be required. In summary, while simultaneous collection would be possible in this scenario one would need either 2 or 4 times the amount of equipment.

Thus while multiple cameras can provide simultaneous image capture, such a system suffers a cost and weight penalty.

A second way to solve the problem of the dark areas on the checkerboard array is to scan the image across the planar focal plane array by moving the entire camera. The camera must be moved 1° at the very least and sometimes as much as 20° depending on the array utilized. However, the camera and its assembly is a massive assembly requiring the entire payload to be moved in order to provide for the scanning.

While the above technique is effective in obtaining all of the pixilated information from the wide angle camera by taking the data at different times from slightly different angles, there are problems not only due to the mass of the camera but also due to the power necessary to move the camera and the large motors involved. Moreover, when the camera is moved there is a finite settling time such that it takes longer before one can take the next picture.

If one needs to provide frame rates of 5 to 30 frames per second, one can see that moving the camera this fast with the attendant settling time is challenging. Depending on how many snapshots are required to make one frame and assuming a frame rate of for instance 10 frames per second, if one needs 4 exposures to make each picture to eliminate the problem of the array gaps, one would need 40 snapshots per second. Moving a massive assembly to accommodate 40 snapshots per second adds mechanical complexity and weight and power penalties.

Another way to scan the image on a planar focal plane array mosaic is to utilize a scanning mirror. However, while scanning mirrors provide acceptable performance there is an issue having to do with the difficulty of packaging such a scanning mirror assembly given mirror reflections. Further, if one has a large aperture camera one would need a mirror larger than the aperture to capture the full range of fields of view.

For instance, if one has a 12" diameter lens one might require a large 16" to 20" scanning mirror. Add to this the requirement to fold the optical path and size becomes a major issue.

Therefore in order to accommodate mosaic focal planes with a single lens/camera assembly, what one essentially has to do is scan the image across the focal plane array mosaic and take sequential readings so that data which may be lost due to a image being focused on a dark area is now recaptured moments later because it is focused on an active area.

In summary, in typical scanning apparatus, an optical element such as a scan mirror or a Risley prism assembly is placed in front of an optical sensor to re-point the sensor to a new field of regard. However, as mentioned above, such systems add size and weight to the optical system and if one is not simultaneously using multiple cameras or if one is not utilizing a movable camera to scan the wide field of view between two or more discrete fields of regard, then one must come up with a compact economic arrangement, which does not vibrate the camera package or destroy the sharpness of the camera image.

SUMMARY OF INVENTION

In the subject invention a stable compact method is provided within the lens assembly of the camera to scan the field of regard of the optical sensor to take care of the problem of focal plane arrays that are not fully populated with image sensing detectors. The use of arrays that have dark areas for which no pixilated information is obtainable requires scanning. In the subject invention this is provided by displacing one or more optical elements in the camera from positions along the optical centerline of the camera, with the movement of the optical element causing the image to be shifted on the focal plane array. In one embodiment this movement is called decentering. Decentering occurs when the optical element is moved away from the optical centerline of the camera in one direction to a fixed decenter position, where it either hits a stop or is decelerated in a controlled manner, and then is moved back in an opposite direction until it reaches a symmetric position relative to the optical axis. The result of this movement is that the image on the focal plane array is translated in a cyclic manner. The result is that the focused image falls on at least one active detector array during a scanning cycle such that image information is not lost.

In order to eliminate vibration associated with moving the internal lenses of the camera, two optical elements are decentered in opposite directions for momentum balancing. Oppositely moving two optical elements with appropriate masses and accelerations in concert allows the transition to be made while imparting zero momentum to the camera. This is important to avoid disturbing the stabilization and/or control system operative in the camera.

It is noted that the movable optical elements and their mounts have ascertainable masses, moments of inertia, and positions relative to the sensor Center of Gravity, and that the optical elements are decentered with appropriate relative accelerations such that no net torque is imparted to the camera during a transition or scan.

The optical design is such that the lens decenter displaces the field of view of the optical sensor by a discrete amount in one or two field of regard directions while maintaining the optical quality of the image.

The subject system is compact and is deployed solely within the optical system of the camera to scan the field of regard of the sensor.

The scanning mechanism described above may be used to move the field of view either in discrete steps or continuously such that the concatenation of multiple images captures the full field of view with no gaps.

In one embodiment, the subject invention requires one or two dimensional linear motion devices driving the lens decentering. In another embodiment with two dimensional lens motion, the motion devices are commanded from a servo controller using inertial feedback from gyroscopes to stabilize the optical line of sight of the optical sensor.

While the optical elements envisioned for the subject invention may be either a pair of positive lenses or a pair of negative lenses, in one embodiment a positive lens is paired with a negative lens to create a near net zero power. Thus, in one embodiment one uses a weak powered pair of lenses. When coupled with focusing lenses to either side of this momentum-compensated assembly, the focused image is toggled from one position to another across the focal plane array without aberration or distortion. Since there is weak power in the two toggling lenses, decentering of the momentum-compensated assembly has minimal impact on the overall image quality or sharpness.

In the above embodiment for momentum-balancing the positive lens is displaced or decentered in one direction, whereas the negative lens is displaced or decentered in an opposite direction.

In summary, the utilization of the positive and negative lenses is for aberration control due to the weak optical power of the momentum-balanced assembly desensitizing the aberrations due to decentering the optical elements.

By controlling the aberrations, one maintains a sufficiently sharp image on the focal plane array, while at the same time being able to scan the image across the focal plane array in a reciprocative or toggled fashion either in the longitudinal direction or the lateral direction, or both, so as to prevent data loss due to array gaps.

In summary, what is provided is a compact momentum-balanced internal optical scanning mechanism for a wide angle camera used in photo reconnaissance and the like, in which a large high resolution but not fully populated array is used to provide full scene coverage with high pixel densities, in which sharpness is maintained and in which the image can be scanned without vibration due to momentum compensation so that the image may be shifted on the focal plane array in such a manner that images focused on a dark portion of the array will move to an active portion of the array, with the sequential read out of the information concatenated into high resolution full scene image data.

BRIEF DESCRIPTION OF THE DRAWINGS

These and other features of the subject invention will be better understood in connection with the Detailed Description, in conjunction with the Drawings, of which.

DETAILED DESCRIPTION

Figure 1:
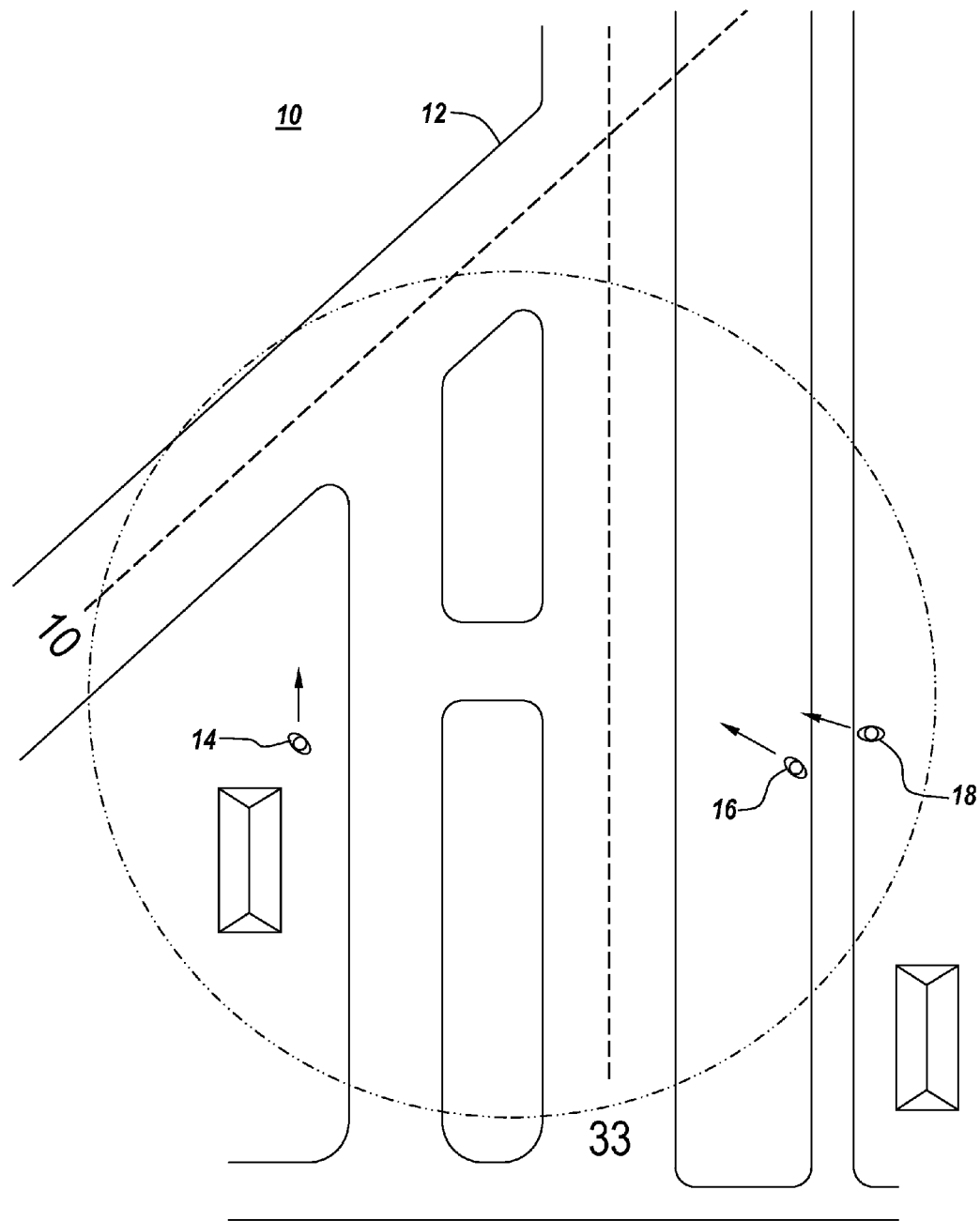
FIG. 1 is a diagrammatic illustration of a scene surveilled by a wide angle camera in which it is desirable to detect small objects in the scene and to detect the motion thereof.

Referring now to FIG. 1, a scene 10 is surveilled by an overflying wide angle camera which may have a field of view of between 40° and 60°. Depending on the height of the camera the amount of geography or terrain that can be captured in a single exposure may be on the order of tens of square miles.

The surveilled area 10 in the illustrated embodiment includes an aircraft runway 12 in which individuals 14, 16 and 18 are captured as they move in the directions indicated by the arrows.

In order to capture such a scene from 10,000 to 20,000 feet with sufficient resolution utilizing a wide angle camera, pixel densities for the focal plane array need to exceed half a billion pixels in order to resolve objects as small as a human being.

While it is possible with narrow angle field of view cameras to resolve objects as small as a human being, when one wishes to surveil a very large area in a single exposure, wide angle cameras must be used and must be provided with an exceptionally large focal plane array. As mentioned above, such extremely large focal plane arrays are not easily fabricated monolithically and as a result as shown in FIG. 2, a mosaic 20 of individual smaller focal plane arrays 22 provide the required extent for the focal plane array.

While the number of pixels in a given smaller focal plane array 22 may be on the order of 5 million pixels or greater, when arrayed as illustrated in a checkerboard arrangement with for instance 90 or more of such side-by-side focal plane arrays, the resulting array becomes a half a billion pixel array.

Figure 2:
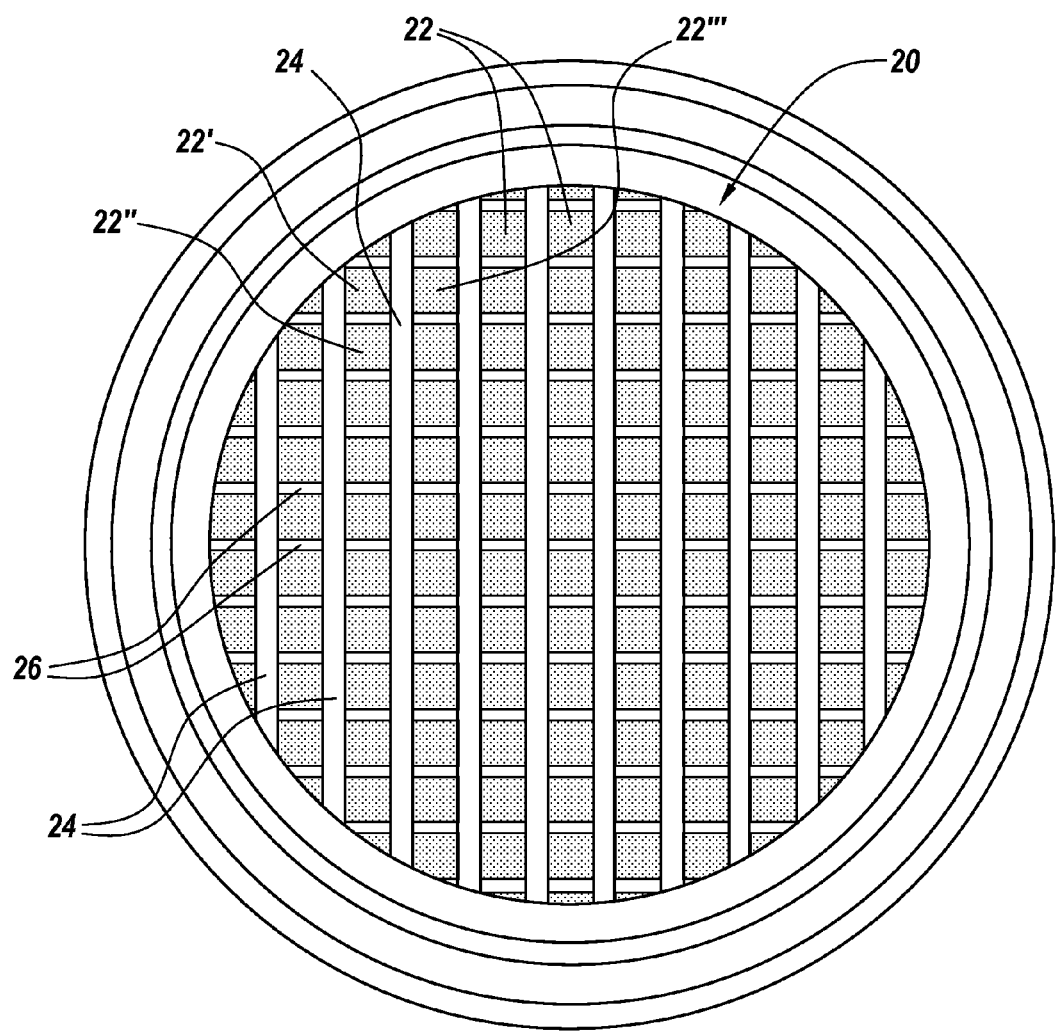
FIG. 2 is a diagrammatic illustration of an extremely large focal plane array made up of a mosaic of individual smaller focal plane arrays, illustrating gaps between the smaller focal plane arrays.

As can be seen from FIG. 2, the individual smaller focal plane arrays 22 are placed side by side. However, inherently in the manufacturing process there is a gap or dark area 24 corresponding to unpopulated areas of the array between for instance focal plane arrays 22' and 22''. Likewise, there is a gap between focal plane arrays 22' and 22'.

As a result, across the focal plane array there are longitudinal regions 24 which are dark in the sense that there are no active photo detectors in these regions. Likewise there are laterally running regions 26 which are dark in that they also do not have active photo detectors in these regions.

As mentioned above, the problem with such a checkerboard mosaic is that up to 25% of the area of the focal plane array is unpopulated or dark.

It is the purpose of the subject invention to solve the problem of an image point landing on a dark or unpopulated area to scan the image back and forth across the focal plane array such that during this scan cycle an image point on a dark unpopulated region is moved to an active detector region.

Figure 3:
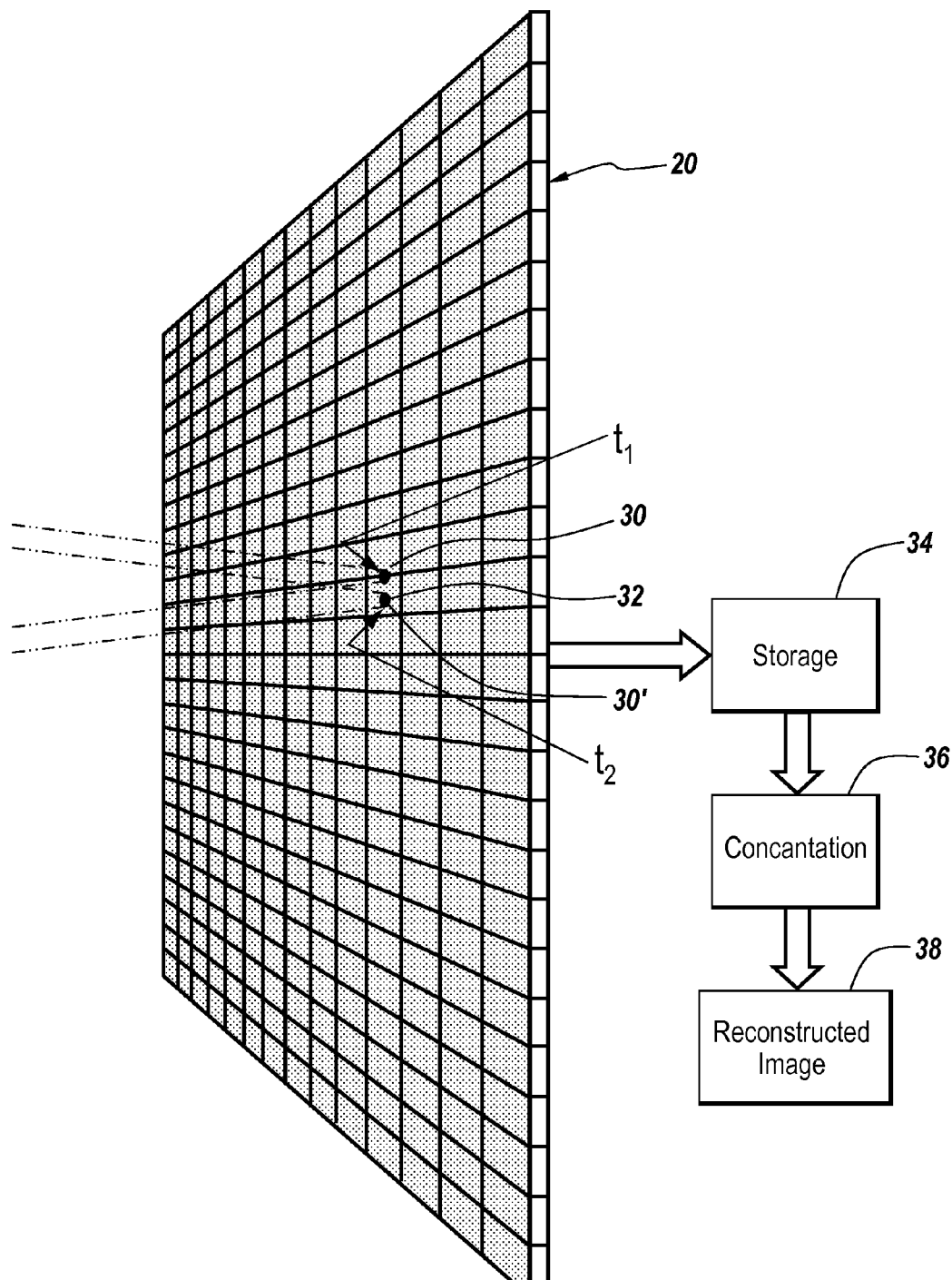
FIG. 3 is a diagrammatic illustration of the utilization of scanning to move an object across a mosaiced focal plane array in which a pixel on the object is moved from a dark gap area to an active device area followed by the storage of the data to be able to reconstruct an image of the full scene without gaps.

This is shown in FIG. 3 in which a mosaic or checkerboard array 20 has an image point 30 landing on an unpopulated region 32 at time $t_1$, whereas the same image point is displaced as illustrated at 30' at time $t_2$ such that it lands an active device.

Figure 8:
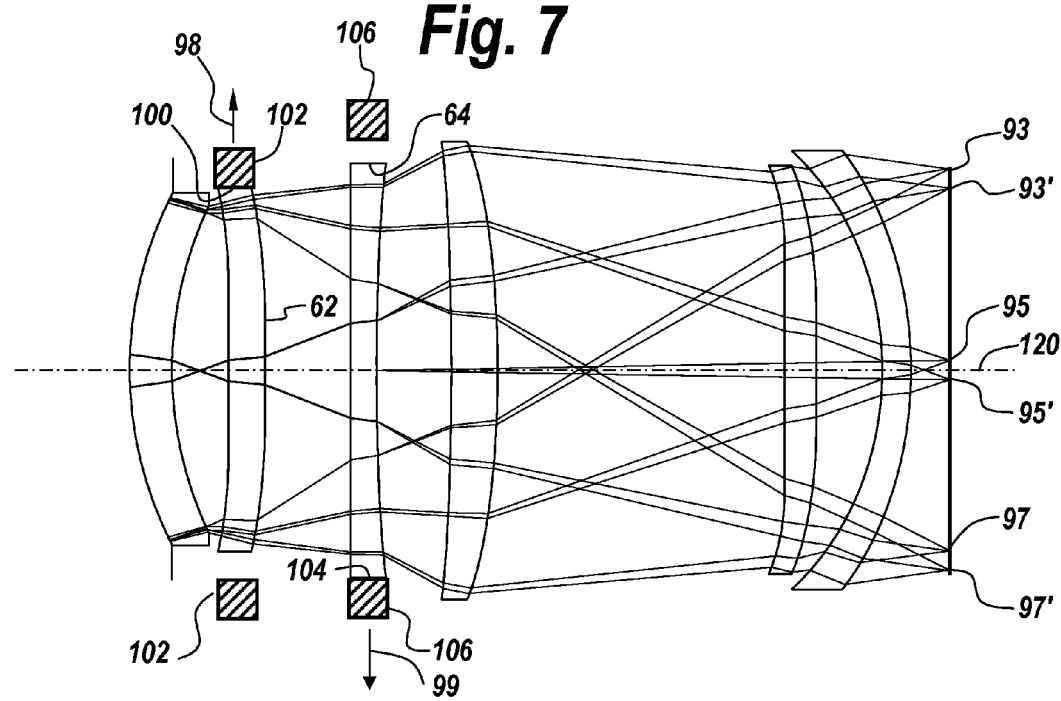
FIG. 8 is a diagrammatic illustration of the lens system of FIG. 7 in which displacement of the positive and negative lenses in opposite directions displaces the image on the focal plane array for common object points; and, FIG. 9 is a diagrammatic illustration of the decentering of the lenses of FIG. 7 utilizing linear motors to oppositely displace the lenses to toggle the resulting image on a focal plane array.

The image capture and reconstruction process can be illustrated by the case of a focal plane consisting of parallel stripes of detector arrays. A single image for one position of the toggling lenses 62 and 64 will therefore capture approximately 50% of the field of view, with some oversizing built in for overlapping of subimages. This image will be stored in storage 34. As shown in FIG. 8, image points 93, 95, and 97 will be collected in this exposure. The lenses 62 and 64 will then be toggled in a momentum-compensating manner to the second image position, and the camera elements are allowed to stabilize. A second time-sequential image will be collected capturing the complementary portion of the field of view, including Image points 93', 95', and 97'. Referring back to FIG. 3, this image will also be stored in Storage 34. The two images in Storage 34 will be concatenated at 36 so that the reconstructed image 38 can be rendered because the image data lost when an image point falls on an unpopulated area is recaptured.

This can be accomplished simply by reading out the data during a scan. Note there will be no data when the image falls on an unpopulated region, whereas there will be data when an image falls onto an active region.

Figure 4:
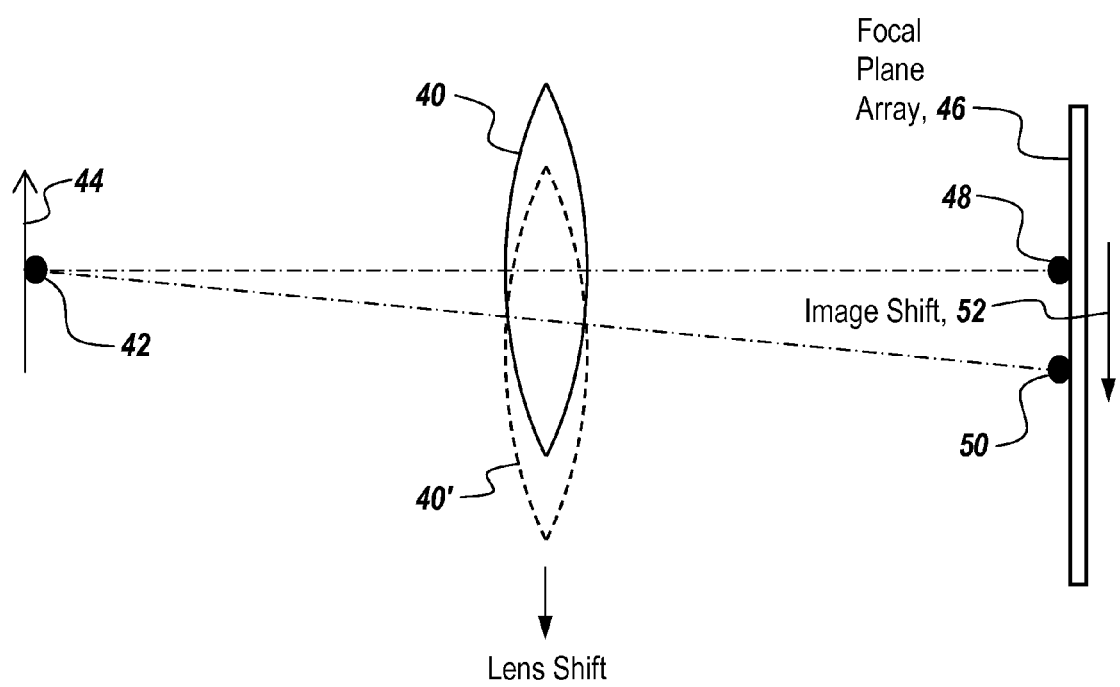
FIG. 4 is a diagrammatic illustration of the scanning of a image on a focal plane array by decentering a lens so as to move a focused image on the focal plane array.

Referring now to FIG. 4 in order to scan an image in the subject invention, a lens 40 focuses a point 42 on an image 44 onto a focal plane array 46 such that image point 42 is focused on the focal plane array at a point 48, here shown on the optical centerline of lens 40.

When lens 40 is shifted to a position 40', the same point 42 is now focused on focal plane array 46 as illustrated by point 50 such that the image is shifted as illustrated by arrow 52.

While such an image shifting mechanism is possible utilizing a single lens by rotating an entire camera, it will be appreciated that due to the mass of the camera and the movement thereof vibration can cause the camera to move resulting in blurring of the image on the focal plane array.

Figure 5:
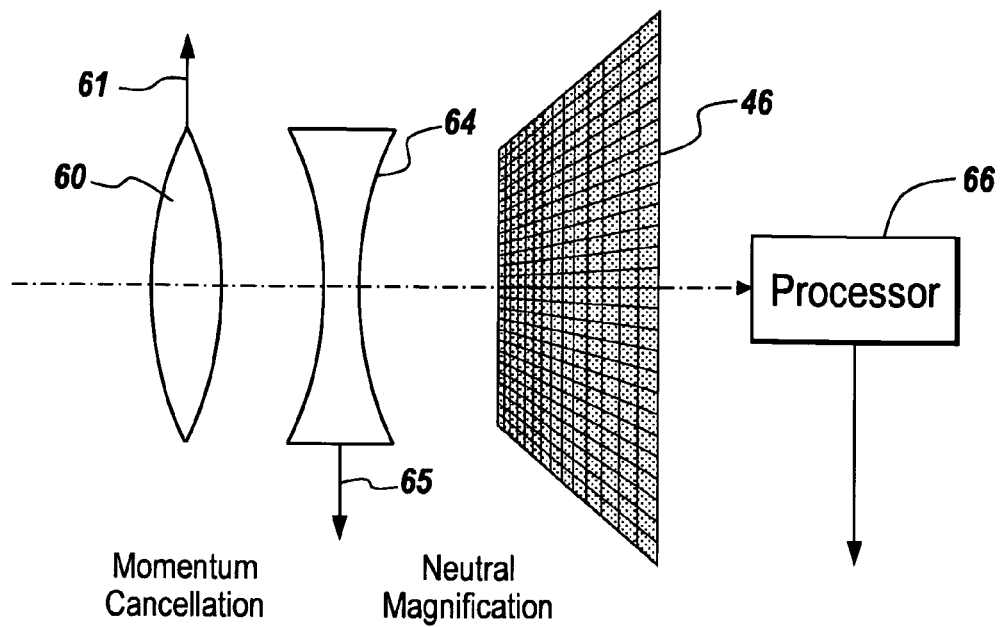
FIG. 5 is a diagrammatic illustration of the utilization of a positive and negative lens to scan an image on a focal plane array by moving the lenses in opposite directions for momentum balancing.

This vibration is canceled or at least minimized in the momentum-balanced arrangement shown in FIG. 5 in which a lens 60 is moved in a direction 61, whereas a lens 64 is moved in an opposite direction as shown by arrow 65.

Here it will be seen that the lenses involved are positive and a negative lens. The utilization of the positive and negative lens if properly constructed results in nearly neutral magnification to improve aberration control. The result is that the images formed on focal plane array 46 and processed by processor 66 result in a reconstructed image which captures all of the image information regardless of whether or not an image point falls on a gap or unpopulated area in the array.

Figure 6:
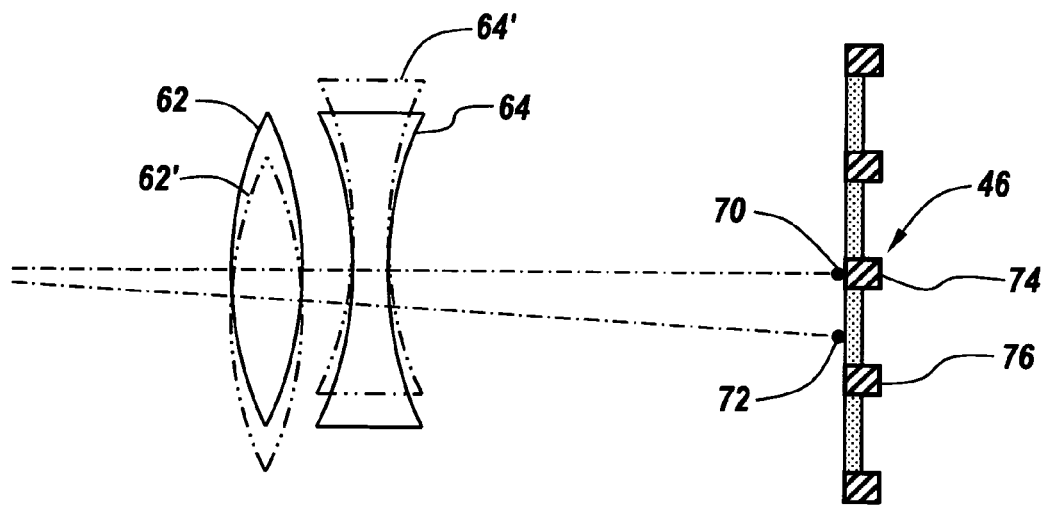
FIG. 6 is a diagrammatic illustration of the movement of the positive and negative lenses of FIG. 5 showing the movement of the image from an optical centerline which falls on a dark region or gap between the smaller focal plane arrays to an active focal plane array.

As illustrated in FIG. 6, the movement of lenses 62 and 64 is depicted by dotted lines 62' and 64' such that an image originally at 70 on focal plane array 46 is moved to a position 72 on this focal plane array. What is illustrated is the fact that image point 70 falls on an unpopulated area 74 of focal plane array 46, whereas image point 72 lands on an active area 76.

Figure 7:
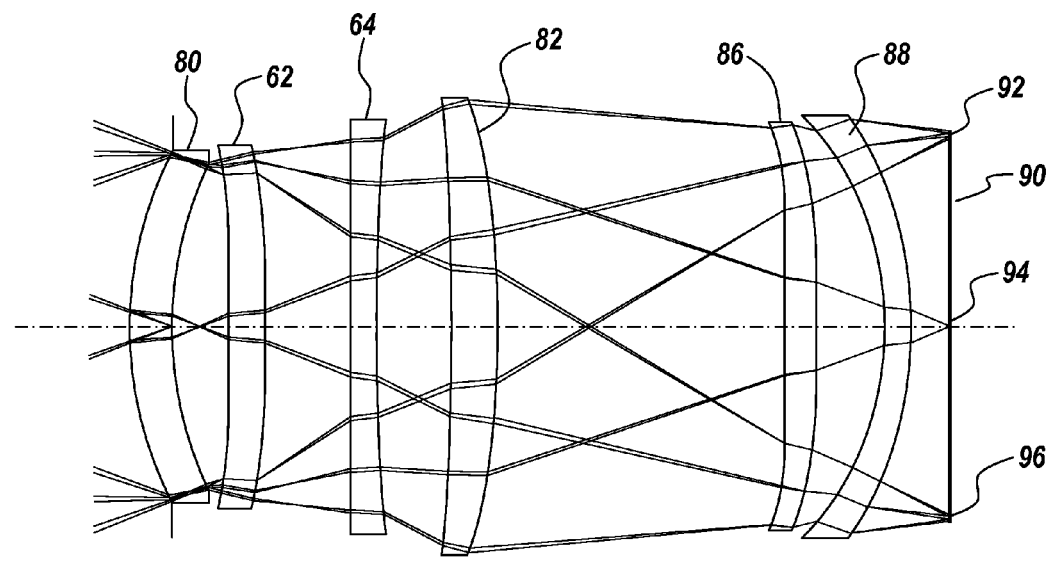
FIG. 7 is a ray diagram of one embodiment of the subject invention in which positive and negative lenses and surrounding optics focus an image on a focal plane array, and the change in camera Field of View in object space is illustrated.

In one embodiment and referring now to FIG. 7, positive lens 62 is combined with negative lens 64 such that with other focusing optics 80, 82, 86 and 88 various points on an image are focused on focal plane 90 at points 92, 94 and 96.

Referring now to FIG. 8, when for instance positive lens 62 is moved in the direction of arrow 98 such that the top portion 100 of the lens 62 rests against a stop 102, and with negative lens 64 being moved downwardly as shown at 99 such that edge of lens 104 rests on stop 106, then as indicated by the ray tracing a point on the image moves from a point 93 to a point 93', from a point 95 to a point 95' and from a point 97 to a point 97', all of which movements being centered about the centerline 120 of the camera.

The optical prescription for the lens illustrated in FIG. 7 and 8 are illustrated in the following table.

| Optical Prescription (dimensions in inches): | | | |
|---|---|---|---|
| | RDY | THI | GLA |
| OBJ: | INFINITY | INFINITY | |
| >STO: | INFINITY | −1.099379 | |
| 2: | INFINITY | −2.000000 | |
| 3: | INFINITY | 2.000000 | |
| 4: | 8.53228 | 0.950000 | |
| 5: | 7.96488 | 1.365659 | Germanium |
| 6: | 76.44090 | 0.945627 | |
| 7: | −247.26200 | 2.172534 | Germanium |
| 8: | 402.54492 | 0.550000 | |
| 9: | 35.33914 | 1.801646 | Germanium |
| 10: | 192.14492 | 1.136238 | |
| 11: | −33.60870 | 7.002439 | Germanium |
| 12: | 44.47671 | 0.750000 | |
| 13: | 258.98955 | 1.675857 | ZNSE |
| 14: | −7.01467 | 0.650000 | |
| 15: | −9.84121 | 1.000000 | AMTIR-1 |
| IMG: | INFINITY | 0.000000 | |

| Decenters (Position 1): | | |
|---|---|---|
| 6: | YDE: | +0.052786 |
| 7: | YDE: | +0.052786 |
| 8: | YDE: | −0.250000 |
| 9: | YDE: | −0.250000 |

| Decenters (Position 2): | | |
|---|---|---|
| 6: | YDE: | −0.052786 |
| 7: | YDE: | −0.052786 |
| 8: | YDE: | +0.250000 |
| 9: | YDE: | +0.250000 |

| Aspheric Parameters (conic constant K = 0 for all elements): | | | | |
|---|---|---|---|---|
| 4: | A: | −.287722E−03 | B: | −.245264E−05 |
| | C: | 0.241947E−07 | D: | 0.321959E−09 |
| 5: | A: | −.459854E−03 | B: | −.390205E−05 |
| | C: | 0.467075E−07 | D: | 0.464323E−09 |
| 6: | A: | −.912873E−03 | B: | −.135059E−04 |
| | C: | 0.936309E−07 | D: | 0.516527E−08 |
| 7: | A: | −.860803E−03 | B: | −.859696E−05 |

| Optical Prescription (dimensions in inches): | | | | |
|---|---|---|---|---|
| | C: | 0.285087E−06 | D: | −.161033E−08 |
| 8: | A: | −.173144E−03 | B: | 0.721890E−05 |
| | C: | −.167682E−06 | D: | 0.284356E−08 |
| 9: | A: | −.185500E−03 | B: | 0.774038E−05 |
| | C: | −.173500E−06 | D: | 0.274467E−08 |
| 10: | A: | −.220295E−03 | B: | −.197884E−05 |
| | C: | 0.618507E−07 | D: | −.693479E−09 |
| 11: | A: | −.198968E−03 | B: | −.194511E−05 |
| | C: | 0.454704E−07 | D: | −.534386E−09 |
| 12: | A: | −.897634E−03 | B: | −.958370E−05 |
| | C: | 0.000000E+00 | D: | 0.000000E+00 |
| 13: | A: | −.106086E−02 | B: | −.487198E−05 |
| | C: | 0.000000E+00 | D: | 0.000000E+00 |
| 14: | A: | −.578390E−03 | B: | 0.596623E−04 |
| | C: | −.182034E−05 | D: | 0.183406E−07 |
| 15: | A: | −.870309E−03 | B: | 0.441625E−04 |
| | C: | −.119020E−05 | D: | 0.946878E−08 |

| Diffractive Optical Elements: | | | |
|---|---|---|---|
| 10: | DOE: | | |
| | HOR: 1.000000 | | HCT: R |
| | HWL: 10000.00 | | BLT: IDEAL |
| | HCO/HCC | | |
| | Cl: −1.1017E−04 | | |
| | Cl: 0 | | |
| 14: | DOE: | | |
| | HOR: 1.000000 | | HCT: R |
| | HWL: 10000.00 | | BLT: IDEAL |
| | HCO/HCC | | |
| | Cl: −7.5013E−04 | | |
| | Cl: 0 | | |

Figure 9:
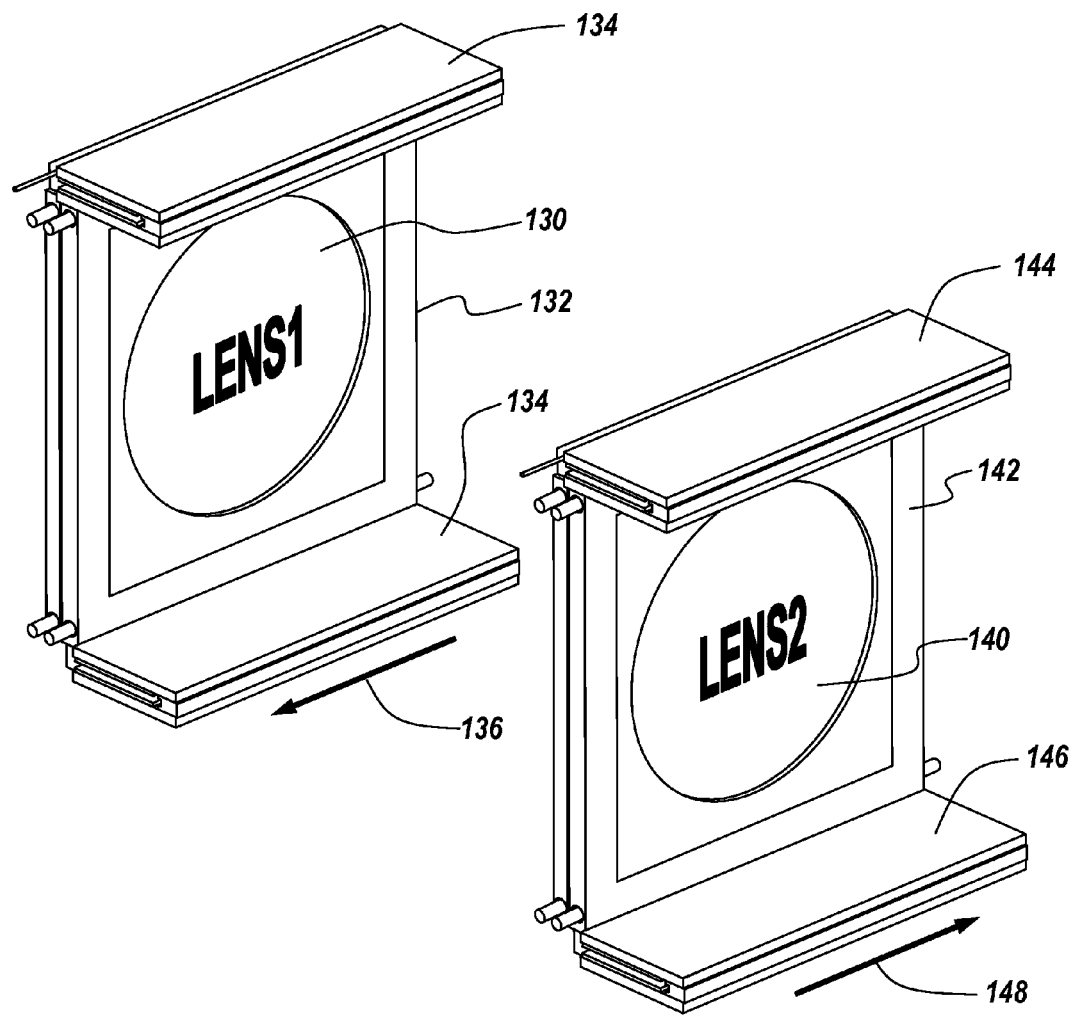

Referring now to FIG. 9, a first lens 130 is carried in a frame 132 which is driven by linear actuators or motors 134 in the direction of arrow 136, whereas a second lens 140 carried by a frame 142 is driven by linear actuators motors 144 and 146 in the direction of arrow 148.

It will be appreciated that the lenses are driven simultaneously in opposite directions at the appropriate relative velocities to accomplish momentum balancing.

The result is a toggling of the image about the centerline of the camera such that if for instance an image point exists at an unpopulated area on the focal plane array, a moment later it will be imaged onto an active portion of the focal plane array.

The result of the above is an internally-carried lens system which moves the image in discrete steps backwards and forwards across the focal plane array utilizing the principal of momentum balancing such that extremely sharp images are maintained on the focal plane array while at the same time permitting gapless reconstruction. Utilizing the weak powered positive and negative lens pair as described in FIGS. 7 and 8, it is possible to minimize lens aberrations.

While the present invention has been described in connection with the preferred embodiments of the various figures, it is to be understood that other similar embodiments may be used or modifications or additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A method for compensating for unpopulated regions in a mosaiced focal plane array utilized with a wide field of view single camera non-tilting optical sensor that has its direction fixed when viewing a scene for surveilling a large area, comprising the steps of:

providing a first lens for the single camera non-tilting optical sensor centered on the optical axis of the optical sensor ahead of the focal plane array;

providing a second lens adjacent the first lens;

cyclically decentering the lenses of the single camera non-tilting optical sensor orthogonally to the optical axis so as to shift the image captured by the optical sensor on the focal plane array such that image information which falls on unpopulated portions of the focal plane array is shifted to an active region of the focal plane array, the decentering including decentering the first lens in one direction and the second lens in an opposite direction, the lenses being configured so as to effectuate momentum-balancing;

storing the information from the focal plane array so as to capture information related to the pixels which fall on a populated array area; and, reconstructing the image from the stored data through concatenation such that the reconstructed image has no gaps.

2. The method of claim 1, wherein both of said lenses are positive lenses.

3. The method of claim 1, wherein both of said lenses are negative lenses.

4. The method of claim 3, wherein one of the lenses is a positive lens and the other of the lenses is a negative lens.

5. The method of claim 4, wherein the focusing power of each of said lenses is approximately equal and opposite for a near neutral magnification.

6. The method of claim 1, wherein the optical sensor has a center of gravity, wherein each of said lenses is mounted to a mount and wherein said lenses and mounts have masses, moments of inertia and positions relative to the sensor center of gravity to establish the momentum-balancing.

7. The method of claim 1, wherein each of the lenses is decentered about the optical axis of the sensor such that no net torque is imparted to the sensor during decentering.

8. The method of claim 1, wherein the mosaiced focal plane array includes a pattern of small plane focal arrays, the pattern establishing populated areas and non-populated areas, with the non-populated areas existing between adjacent ones of the small focal plane arrays.

9. The method of claim 1, wherein the mosaiced focal plane array has a pixel count exceeding half a billion pixels.

10. The method of claim 1, wherein the optical sensor has a wide angle lens and wherein the mosaiced focal plane array has a size equal to or greater than that of the wide angle lens corrected image plane area.

11. A system for scanning an image across a large mosaiced focal plane array carried by a single camera non-tilting optical sensor having a wide angle lens and a centerline, said mosaiced focal plane array made up of a pattern of small focal plane arrays having gaps therebetween that establish unpopulated areas, comprising:

a decenterable first lens decenterable in a direction orthogonal to the optical centerline of said optical sensor between said wide angle lens and said focal plane array;

a second decenterable lens adjacent said first decenterable lens and decenterable in said orthogonal direction;

a drive for cyclically decentering said first and second decenterable lenses in opposite directions for momentum-balancing;

a storage unit coupled to the outputs of said small focal plane array for storing the outputs therefrom; and, a module for reconstructing an image from the stored data from said storage unit such that image information lost through images focused onto an unpopulated area of said mosaiced focal plane array is reconstructed from image data from the same images shifted away from said unpopulated area due to the decentering of said lens.

12. The system of claim 11, wherein said mosaiced focal plane array includes a pattern of smaller focal plane arrays spaced one from the other, the spacing resulting in said unpopulated focal plane array areas.

13. The system of claim 12, wherein said decenterable lens is toggled between two decentering positions such that any image that is focused on an unpopulated region will subsequently be focused on an active region of said mosaiced focal plane array.

14. The system of claim 13, wherein each of said lenses is carried in a frame and wherein the masses, moments of inertia and positions relative to the sensor center of gravity are set such that upon decentering in opposite directions the associated accelerations exert no net torque on said optical sensor.

15. The system of claim 11, wherein said lens decentering displaces the field of view of said optical sensor by a discrete amount in at least a first field of regard direction.

16. The system of claim 15, wherein said decenterable lenses are decentered in a direction orthogonal to said first field of regard direction so as to accommodate a second field of regard direction.

17. The system of claim 13, wherein one of said decenterable lenses is a positive lens and the other of said decenterable lenses is a negative lens.

18. The system of claim 17, wherein the power of said positive lens is equal to and of opposite power relative to said negative lens, thereby to establish a near net zero magnification.

* * * * *